US005225855A

United States Patent [19]

Hansen et al.

[11] Patent Number: 5,225,855

[45] Date of Patent: Jul. 6, 1993

[54] ELECTROGRAPHIC FLARE REDUCTION BY SPACING AND GAS CONTROL

[75] Inventors: Lorin K. Hansen, Fremont; Stephen D. White, Santa Clara, both of Calif.

[73] Assignee: Xerox Corporation, Stamford, Conn.

[21] Appl. No.: 782,024

[22] Filed: Oct. 24, 1991

[51] Int. Cl.[5] .............................................. G01D 15/06

[52] U.S. Cl. ................................ 346/155; 346/139 C

[58] Field of Search ............................ 346/155, 139 C

[56] References Cited

U.S. PATENT DOCUMENTS

| | | | |
|---|---|---|---|
| 3,553,717 | 1/1971 | Roos | 346/155 |
| 3,979,759 | 9/1976 | Simm | 346/74 |
| 4,030,106 | 6/1977 | Bestenreiner et al. | 346/153 |
| 4,124,854 | 11/1978 | Kirtikar | 346/155 |
| 4,254,424 | 3/1981 | Landheer et al. | 346/139 |
| 4,424,522 | 1/1984 | Lloyd et al. | 346/154 |
| 4,459,603 | 7/1984 | Kimoto | 346/155 |
| 4,476,473 | 10/1984 | Wako | 346/155 |
| 4,743,925 | 5/1988 | Sheridon et al. | 346/159 |
| 4,743,927 | 5/1988 | Sasaki | 346/160 |
| 4,801,919 | 1/1989 | Hansen et al. | 346/153.1 |
| 4,809,027 | 2/1989 | Boyer et al. | 346/159 |
| 4,853,719 | 8/1989 | Reale | 346/155 |
| 4,905,026 | 2/1990 | Day | 346/155 |
| 4,918,468 | 4/1990 | Miekka et al. | 346/159 |
| 5,030,974 | 7/1991 | Tange | 346/155 |
| 5,107,284 | 4/1992 | Cyman et al. | 346/159 |

OTHER PUBLICATIONS

"A Gas Source For Improving Ionography Output" by Koji Okumura Xerox Disclosure Journal vol. 14, No. 2, p. 53, Mar./Apr. 1989.

"Electrical Breakdown of Gases" by Meek and Craggs, pp. 538–553 published by John Wiley and Sons (1978).

*Primary Examiner*—Benjamin R. Fuller
*Assistant Examiner*—Randy W. Gibson
*Attorney, Agent, or Firm*—Lisa M. Yamonaco

[57] ABSTRACT

An apparatus for selectively setting the distance between the write head of an electrographic printing apparatus and a recording medium in combination with the use of a gas, present in the gap between the medium and the write head whereby the gas has a Paschen curve minimum lower than the Paschen curve for air. The combination of increasing the distance of the head from the medium along with the use of a gas as specified decreases the amount of flare while decreasing dropout and maintaining image density.

29 Claims, 4 Drawing Sheets

ELECTROGRAPHIC FLARE REDUCTION BY SPACING AND GAS CONTROL

BACKGROUND OF THE INVENTION

This invention relates to eliminating defects caused during electrographic printing, and more particularly to reducing flaring in an electrographic printing environment.

Electrographic marking, or printing, upon an image recording medium comprises a two-stage process. First, ions are created by electrical breakdown of air in a gap between writing nibs and the recording medium, and then ions (usually negative) are conducted to selected image pixel locations to form an electrostatic image on the recording medium. Second, the electrostatic image is made visible by "toning", which usually involves the passing of the recording medium, bearing the nonvisible, electrostatic image, into contact with a liquid solution containing positively charged dye particles in colloidal suspension. The dye particles are attracted to the negative charge pattern and the density of the dyed image will be proportional to the potential or charge density on the medium.

Two types of recording media in common usage are paper and film. For paper, the bulk is treated to make it conductive and a dielectric layer of about 0.5 mil thick is coated upon its image bearing side. For film media, a substrate such as Mylar ®, is given a very thin conductive layer and an overcoat dielectric layer upon its image bearing side.

In the electrographic printing process, electrical contact must be made to the conductive layer of the medium in order to charge the dielectric layer with the electrostatic image. In the case of paper, this is accomplished by direct electrical contact with the backplates of the writing device to the "backside" of the base paper. In the case of film, conductive edge stripes pass through the dielectric layer to the conductive layer providing electrical paths to the conductive layer. Electrical contact is made to the conductive layer through these stripes.

In the process, there must also be a means for establishing the electrical potential difference between the conductive layer and the nibs sufficient for electrical breakdown of the air. In the case of paper, the potential of the conductive base is established by pulsing a backplate which has resistive/capacitive coupling to the back of the medium. In the case of film, the potential of the conductive layer is also established by pulsing the backplate, which in this case is only capacitively coupled to the conductive layer through the Mylar ® base. The latter is shown in U.S. Pat. No. 4,424,522 to Lloyd et al., assigned to the same assignee as this application, and hereby incorporated by reference. Also, refer to U.S. Pat. No. 4,254,424 to Landheer et al., assigned to the same assignee as this application, and hereby incorporated by reference, which discloses an electrostatic recording device wherein a latent electrostatic image is recorded on a dielectric coated sheet by a stylus array spaced apart from the sheet to form an ionization gap.

For background purposes, referring to FIGS. 1 and 2, shown is a model for explanation of the phenomenon occurring in the charging process via electrographic head 20 and paper recording medium 30. For clarity, only one nib 24 is shown but it can be appreciated that many nibs, positioned in a longitudinally extending array or nibline, are housed in head 20. Nib 24 is formed on substrate 22 or suspended in an insulating mold (not shown), and is connected to lead line 23 for supplying a charging voltage to nib 24. Air gap 27 exists between the end of nib 24 and the surface of recording medium 30 in order that the medium surface may be charged, or receive deposited charge. Medium 30 comprises a dielectric layer 32 deposited on a conductive base 34.

A pulsed voltage is applied between nib 24 and counter electrode or "backplate" 36. Because of the electric field concentrations during the voltage pulse via nib 24 at the edges of nib 24, there are field emissions 26 of electrons at the edges of nib 24. These electrons cause an ionization of air in gap 27. This ionization ignites a glow discharge in discharge region 28, near the central portion of nib 24 surrounded by field emission 26. The portion of gap 27 represented by discharge region 28 becomes ionized and therefore conductive. Discharge region 28 charges up the medium to a voltage where the voltage across the core gap drops to the glow discharge maintenance voltage. When the voltage drop reaches the glow discharge maintenance voltage, the discharge region 28 will be extinguished and the charge deposition on the surface of medium 30 will cease.

In electrographic printing, a non-uniformity or non-repeatability of the electrical discharge at the recording electrodes or nibs creates a problem in image quality and should be avoided. As a result of this discharge non-uniformity, the latent electrostatic image spots, or pixels, created on the recording medium are non-uniform in shape and may be enlarged or irregular in size compared to other latent image spots on the same page or line. This phenomenon is known in the art as "flare" or "flaring". Flare is detrimental to the image quality of printed or plotted images on the recording media because the "flared out", irregular dot patterns give the image an unattractive, irregular, speckled appearance.

The flared out dots are accompanied by an unusually large current pulse because of the large current needed to charge up the enlarged spot. Therefore, one way of reducing the size of flaring is to place limiting resistors in the electrode lead lines between the driving logic and the nib ends. Even with such limiting resistors in place, however, some flaring still occurs and spot size is still irregular and undesirable.

For further explanation of flaring, and referring especially to FIG. 1, shown is a single developed pixel 10 initially formed as a circular latent image spot by a single (in this case, wire) electrode or nib 24 (FIG. 2) and subsequently made visible with a conventional developer. Thus, the developed pixel 10 represents a visual appearance of the latent image spot. Pixel 10 is made up of core 12 and sometimes one or more nuclei 14 which surrounds core 12 and which are caused by field emission at the nib edges. Thus, nuclei 14, when they occur, are always formed around the perimeter of core 12. If the charge deposited at one of the nuclei 14 becomes excessive, there can develop a lateral electrical breakdown or spreading of this charge across the surface of dielectric layer 32 causing flares. Therefore, flare 16 usually appears as an enlargement of nuclei 14 resulting in a nonuniform developed image spot represented by the outer contour of pixel 10. In FIG. 1, core 12 is shown in cross hatch so as to distinguish from nuclei 14 but would normally be integrally developed with the remaining portion of developed pixel 10. Core 12 is charged in accordance with the writing voltage applied between nib 24 and counter electrode 36.

As seen in U.S. Pat. No. 4,801,919 to Hansen et al. which is assigned to a common assignee as this application, and is hereby incorporated by reference, flaring is reduced by incorporating a discharge quenching agent in the composition of the dielectric charge retentive layer of the electrographic recording medium. The patent also discloses coating a flaring suppressor agent on the surface of the dielectric layer of the electrographic recording media to enhance the charge retention or binding properties of the layer in order to suppress lateral discharge or charge spreading during recording. Although this method is effective, it may not always be practical or cost effective to treat the recording media with such an agent. Thus, further methods of reducing flaring are warranted.

As described above, transfer of electrostatic images onto a medium requires the movement of electrical charges through a gas in a gap between the electrostatic writing head and the recording medium. In the past, the gas in the gap has been ambient air. When the gap is relatively large (i.e. greater than approximately 8 microns) the mechanism of charge transfer can be explained on the basis of gaseous discharge phenomena. The Paschen curve, as seen in FIG. 3, describes the limiting conditions for charge transfer in this range. The Paschen curve is a plot of the minimum voltage which must be applied across a gap of thickness, d, filled with a gas at pressure, p, before glow-discharge breakdown will occur. As will be understood, approximately the voltage above the breakdown voltage is written on the medium as the electrostatic image.

A problem encountered while using air in the gap is that as the gap increases, the voltage needed for breakdown increases, thus, the amount of voltage available for forming the electrostatic image decreases. As the charge above the breakdown voltage decreases, the density of the resulting image decreases resulting in an image which is less desirable.

Other image quality problems resulting from electrographic printing have been addressed in the art. U.S. Pat. No. 3,979,759 to Simm and U.S. Pat. No. 4,030,106 to Bestenreiner et al. disclose a method and arrangement for eliminating undesirable density variations, or background noise, resulting from electrographic printing. Both patents discuss the use of nitrogen gas, or other inert gasses, blown through an opening in the housing containing the electrostatic print head for increasing the discharge current of a corona discharge. Xerox Disclosure Journal, Volume 14, Number 2, dated March/April 1989, entitled "A Gas Source For Improving Ionographic Output" suggests the use of pure nitrogen gas in a corona chamber of an ionographic machine. The addition of pure nitrogen into this configuration is used to increase ion generation efficiency thus resulting in better imaging. Although the above problems in image quality have been addressed, the above references utilizing Nitrogen do not address flaring or the prevention of irregular dot formation during electrographic printing.

SUMMARY OF THE INVENTION

In accordance with the present invention, provided is a system for selectively setting the distance between the write head of the electrographic printing apparatus and the recording medium in combination with the use of a gas, having a Paschen curve lower in voltage than that for air for a given gap distance, for instance Nitrogen, present in the gap between the medium and the write head. The combination of increasing the distance of the head from the medium with the use of such a gas decreases the amount of flare while maintaining image density and avoiding dropout or image loss.

The system uses a spacing means which is substantially parallel to the nibline. The spacing means is attached to a positioning means which locates the spacing means in a position reaching above the nibline, setting the exact spacing required between the nibline and the recording medium. The distances disclosed for the gap, created by the spacing means, is in addition to the spacing already created by the pigment particles of the medium.

A gas having a Paschen curve of less voltage than that for air, like Nitrogen, can be introduced into the gap between the recording head and the spacing means allowing the gas to be present in the gap between the recording medium and the nibline. Paschen curves for Nitrogen and various other inert gasses, require a breakdown voltage less than that of air, in the region of 8 microns and above, to accomplish breakdown. With a lower minimum voltage required for breakdown and a larger gap, the use of such a gas results in more voltage being available for the electrostatic image. As will become apparent, the larger gap decreases flaring and the use of nitrogen, or other inert gasses with the larger gap as described above, results in an electrostatic image having full density as well as reduce flare. Therefore, the use of the gas, along with a predetermined spacing which is optimal for that gas, reduces the flaring effect during the writing process while maintaining image density.

DETAILED DESCRIPTION OF THE INVENTION

Figure 1:
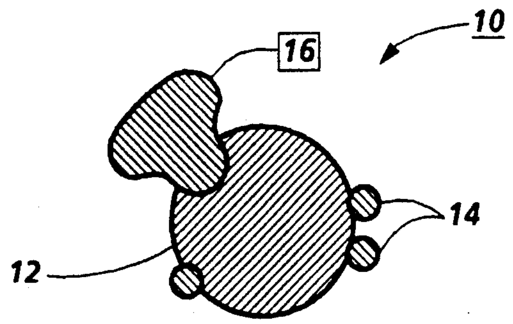
FIG. 1 is an enlarged schematic drawing illustrating the nature of flaring via a developed pixel spot from a single nib of an electrographic head.
Figure 2:
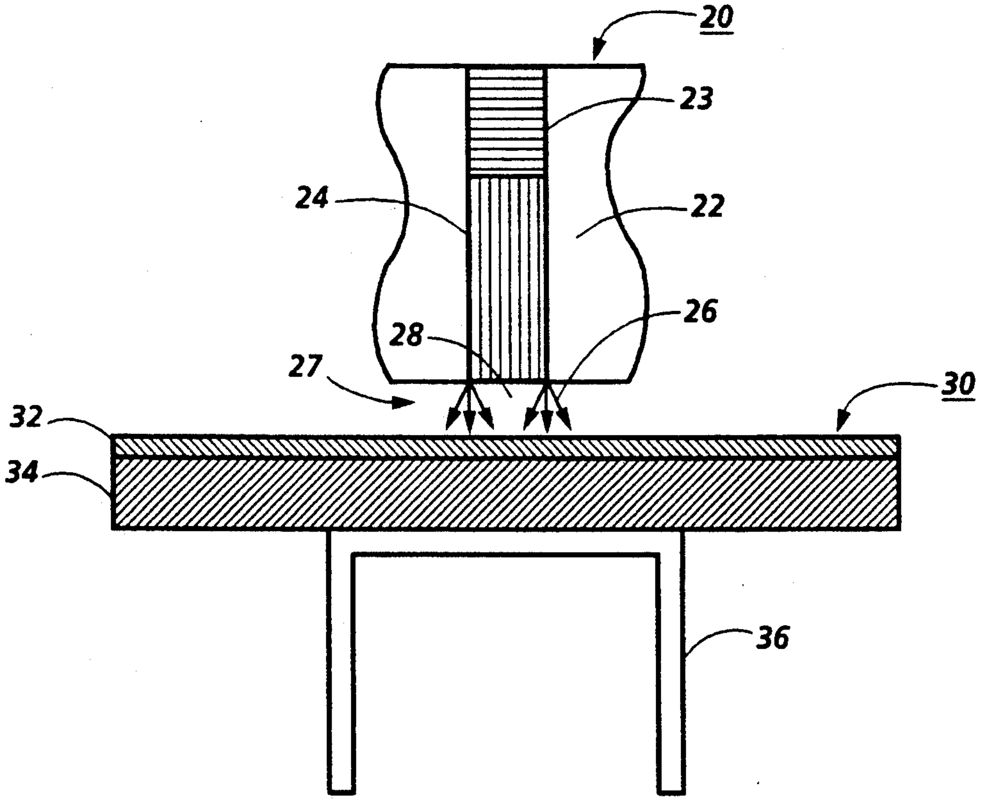
FIG. 2 is an enlarged schematic drawing illustrating the relationship between one writing nib of an electrographic head and the standard recording medium.
Figure 3:
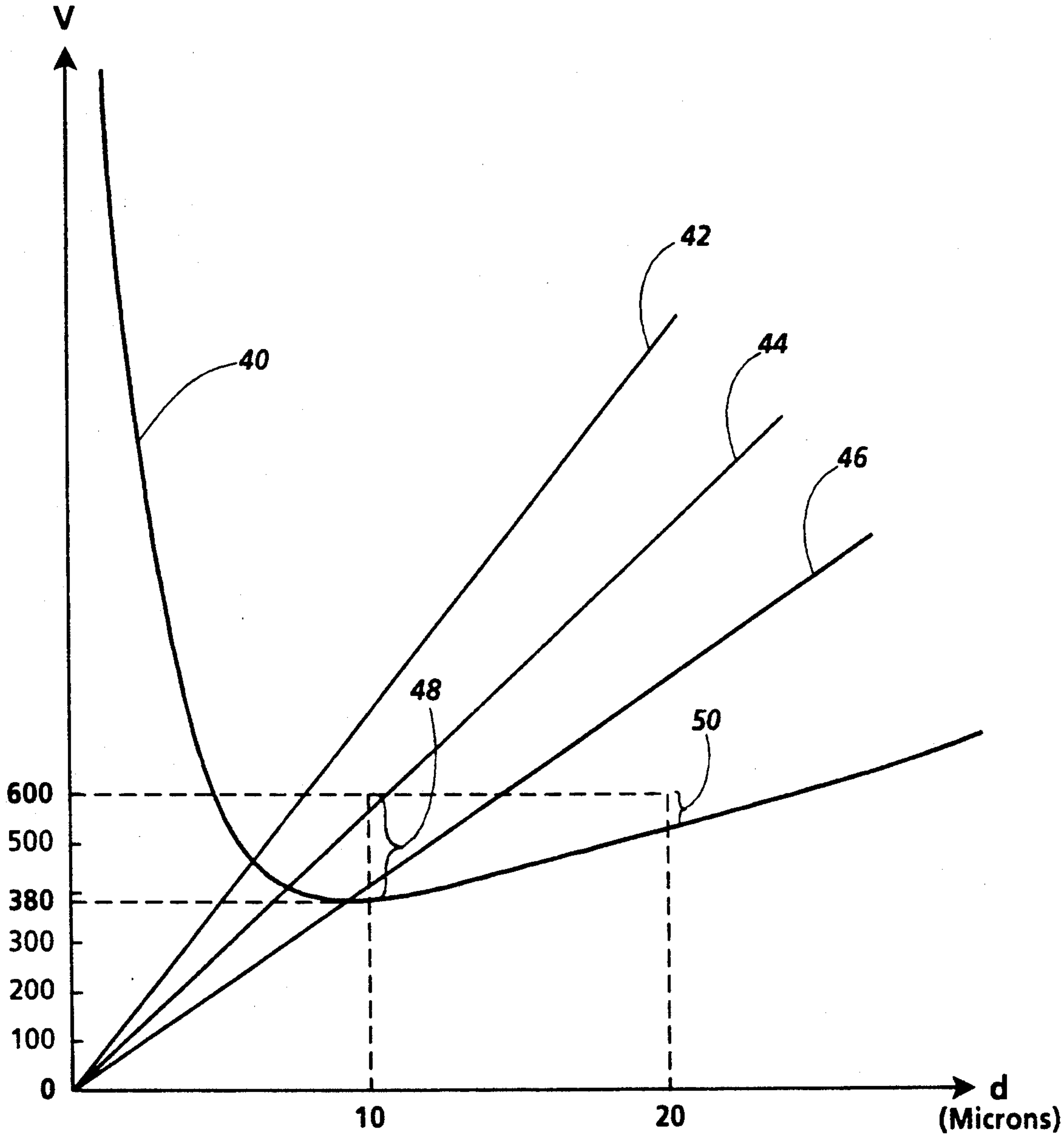
FIG. 3 is a graph showing the Paschen curve for air and the related electric fields and phenomenons that occur during electrographic writing.

In accordance with the present invention and referring also to FIGS. 1-3, as discussed above, the discharge that lays down the electrostatic image on medium 30 is a glow discharge. The breakdown voltage for the glow discharge is dependent on air gap 27 and this dependence is given by Paschen curve 40 which represents the Paschen curve for air. With the glow discharge, the breakdown voltage and the maintenance voltage are approximately equal for the discharge operating near the minimum of curve 40 or approximately 380 volts. When voltage is applied to nib 24, the discharge does not start immediately. Rather, there is a time lag, or a variable time delay, while waiting for some "seed" electrons to appear in gap 27. Near the minimum of curve 40, where electronic writing takes place, the breakdown voltage is approximately 380 volts. If the voltage applied is 600 volts, there is an overvoltage of approximately 220 volts shown as distance 48. It is overvoltage distance 48 that appears as the electrostatic image on medium 30 once the discharge extinguishes.

The triggering of glow discharge in electrographic writing is not by natural ionization in air gap 27 but rather by field emission electrons. This emission occurs at some predescribed field threshold. Such a threshold is indicated by line 44. In practice, field emission thresholds may vary over a range, such as between maximum line 42 and minimum line 46 which is also referred to as the field emission region. Because of the field emitted electrons, the time lag is reduced to less than one microsecond. However, within the field emission range, flaring is more likely to occur.

As shown in FIG. 3, if the spacing is increased from 10 microns to 20 microns, i.e. air gap 27 is increased, the field strength will be cut in half. Therefore, imaging will be well out of the field emission region distinguished by lines 42 and 46 thus reducing the possibility of flaring. Unfortunately, with this increased spacing, the overvoltage on the electrodes of approximately 80 volts, (i.e. distance 50) representing the voltage available for the image outside of the field emission range, has decreased. The decrease of the overvoltage used for writing results in dropout (i.e. no discharge and no image) or a lighter image if the image on medium 30 occurs.

Figure 4:
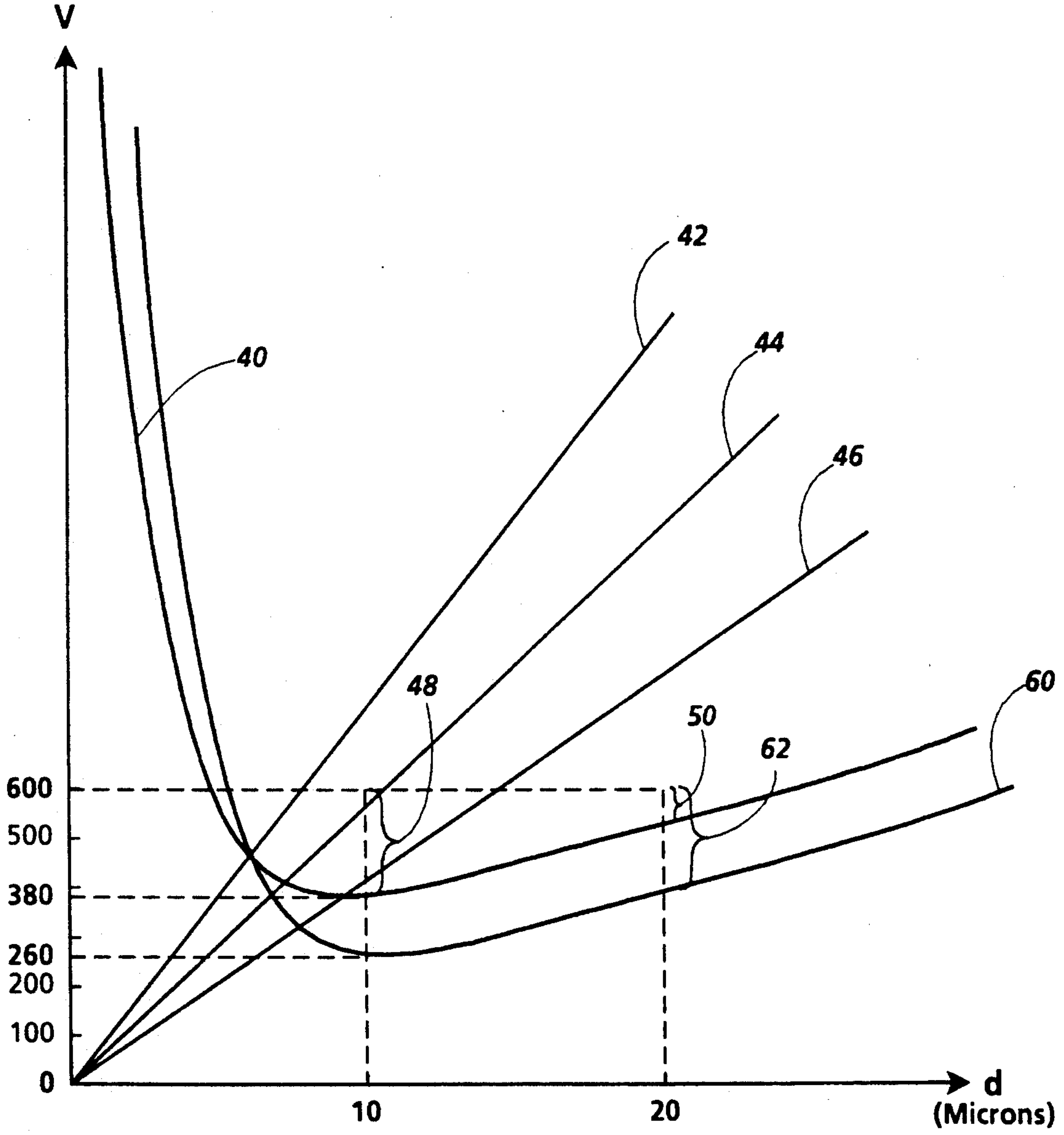
FIG. 4 is a graph adding the Paschen curve for nitrogen to that of FIG. 3.

To correct for this image loss, as shown in FIG. 4, a gas having a Paschen curve voltage which is less than the Paschen curve voltage for air 40 can be introduced in air gap 27. As shown, for the case of a Nitrogen Paschen curve 60, the minimum voltage on curve 60 is approximately 260 volts which is approximately 120 volts less than the minimum voltage of curve 40. Thus, the approximate 120 volt difference is available as additional image voltage. If the distance remains at 10 microns with the introduction of Nitrogen into gap 27, the overvoltage above curve 60 necessary for a desirable image density would still reach into the field emission region as in the case with air. Therefore, at 10 microns, the introduction of Nitrogen into gap 27 is alone not sufficient to reduce flaring.

However, an increase in gap 27 to 20 microns with the addition of Nitrogen into gap 27 allows the overvoltage above curve 60, shown as distance 62 (approximately 120 volts) to be available as image voltage. At this spacing, the image voltage necessary for desirable image density does not go into the field emission area therefore flaring is reduced. In other words, the use of Nitrogen in gap 27 at 20 microns causes the image density to return to that of using air with the original spacing of 10 microns, but without the subsequent flaring. Although Nitrogen gas has been disclosed, it can be appreciated that other gasses having a Paschen curve with a voltage less than that for air, such as Argon and Helium, can be envisioned. Also, it should be clear that each gas which can be used will have its own optimal distance defining gap 27. Although 20 microns is used as an example, the system could be optimized by adjusting gap 27.

Figure 5:
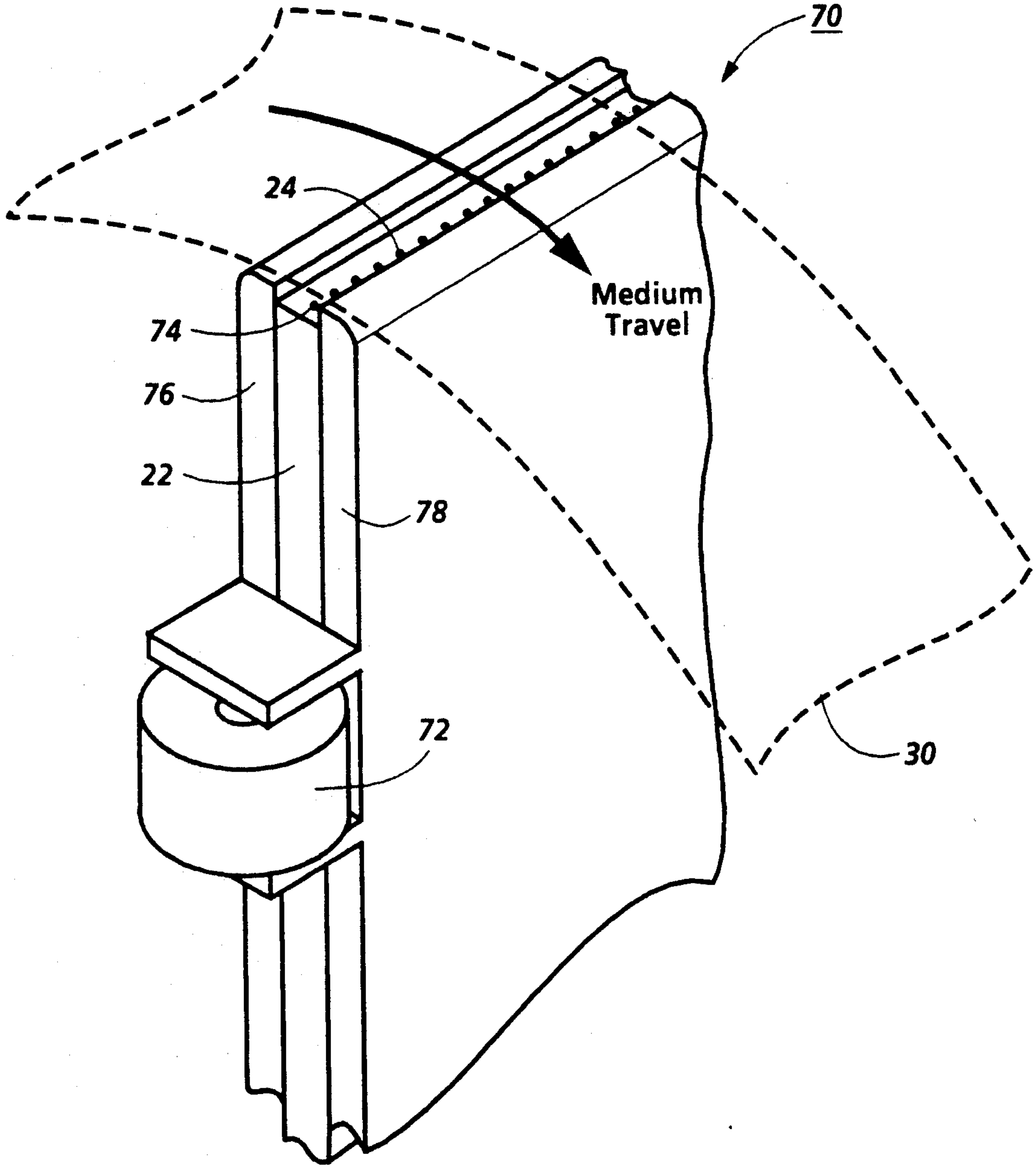
FIG. 5 is a schematic drawing of an exemplary electrographic writing system of the disclosed invention.

Referring also to FIG. 5, where like numerals represent like components as described above, there is shown an exemplary electrographic writing head system 70 according to the disclosed invention. Nibline 74 comprises a series of electrodes, or nibs 24, arranged in a longitudinally extending array supported by substrate

22 or an insulated mold (not shown). On either side of substrate or mold 22 there are adjustable spacing members in the form of retractable slabs 76, 78. As seen in the drawing, retractable slabs 76, 78 are positioned a distance above nib line 24, for example the 20 microns discussed above or any required distance, causing an increased gap between medium 30 and nibline 74. Although the Figure shows retractable slab 76 positioned above nibline 74, it can be envisioned that retractable slab 76 may also be positioned below nib line 74. Adjustable positioning of slabs 76, 78 may be optimized for the gas being used in gap 27 (or the particular application, or for any other purposes).

The adjustable positioning of slabs 76 and 78 can be controlled by motion actuator 72 which can be in the form of a piezo-electric activator as shown or can be a differential screw or equivalent. Further, air pressure can be used to place and hold slabs 76 and 78 in position as well as any means of performing a placement and hold function. While spacing means using retractable slabs has been disclosed, any form of spacing means creating a prescribed spacing, or gap, between medium 30 and nibline 74 can be envisioned.

Slabs 76, 78 can be constructed incorporating a wear-resistant material such as a metal or a ceramic. Slabs 76 or 78 can be moved upward either together as shown or independently, above nibline 74 holding media 30 a prescribed distance above nibline 74. The movement of slabs 76, 78 above nibline 74 should be such that a gap from ½ mil to 2 mils is created depending on the gas used to fill the gap between the nibline and the slabs. For instance, 20 microns (0.78 mils) could be a desirable gap for use with Nitrogen.

The gas mentioned above can be introduced into gap 27 in any manner. For instance, the gas can be made to leak up through a space between the sides of retractable slabs 76 or 78 and substrate 22 causing a concentration of gas in the writing gap between medium 30 and nibline 74. Alternately, the gas can be blown into gap 27 from either or both ends of writing head system 20.

Upon completion of a plot, slabs 76, 78 can be retracted below the surface of the nibline for allowing the medium to be passed over these nibs for cleaning them. Although two retractable slabs has been disclosed, a device having one or more retractable slab for positioning media 30 a above nibline 74 can also be envisioned.

While the invention has been described with reference to the structures disclosed, it is not confined to the details set forth, but is intended to cover such modifications or changes as may come within the scope of the following claims:

We claim:

1. An electrographic recording device which writes image data on a recording medium by electrostatic discharge, said device configured to reduce flaring caused by a writing voltage being within a field emission region, comprising:

means for recording including a series of electrodes arranged in a longitudinally extending array spaced from said recording medium by a gap distance;

means for providing an image voltage, whereby said image voltage is the difference between said writing voltage and a breakdown voltage threshold, said breakdown voltage threshold being defined by a Paschen curve; and means for reducing flaring by lowering breakdown potential in said gap said means for reducing flaring including:

spacing means for setting said gap distance to a magnitude great enough to cause said writing voltage to be out of said field emission region, and, gas supply means for supplying a gas to said gap, said gas having a Paschen curve voltage less than a Paschen curve voltage for air, whereby the introduction of said gas causes said image voltage to be sufficient for writing by increasing the difference between said writing voltage and said breakdown voltage threshold.

2. A device according to claim 1 wherein said spacing means is adjustable with respect to said recording means.

3. A device according to claim 1 wherein said gap is ½ to 2 mils inclusive.

4. A device according to claim 2 wherein said gap is ½ to 2 mils inclusive.

5. A device according to claim 1 wherein said spacing means comprises at least one slab extending substantially parallel to said array and adjacent to said recording means.

6. A device according to claim 2 wherein said spacing means comprises at least one slab extending substantially parallel to said array and adjacent to said recording means.

7. A device according to claim 2 wherein said spacing means is retractable allowing cleaning of said recording means when said recording means is not recording.

8. A device according to claim 6 wherein said slab is retractable allowing cleaning of said recording means when said recording means is not recording.

9. A device according to claim 8 wherein said retractable slab is controlled by a piezo-electric actuator.

10. A device according to claim 8 wherein said retractable slab is controlled by a differential screw.

11. A device according to claim 1 wherein said gas is Nitrogen.

12. A device according to claim 1 wherein said gas is Argon.

13. A device according to claim 1 wherein said gas is Helium.

14. A device according to claim 1 wherein said spacing means has a wear-resistant material on a surface where said spacing means comes in contact with said medium.

15. A device according to claim 2 wherein said spacing means has a wear-resistant material on a surface where said spacing means comes in contact with said medium.

16. A device according to claim 6 wherein said slab has a wear-resistant material on a surface where said slab comes in contact with said medium.

17. A device according to claim 14 wherein said wear-resistant material is a metal.

18. A device according to claim 14 wherein said wear-resistant material is a ceramic.

19. An electrographic recording device which writes image data on a recording medium, said device configured to reduce flaring, caused by a writing voltage being within a field emission region, comprising: means for recording including a series of electrodes arranged in a longitudinally extending array spaced from said recording medium by a gap distance;

means for providing an image voltage, whereby said image voltage is the difference between said writing voltage and a breakdown voltage threshold, said breakdown voltage threshold being defined by a Paschen curve; and means for reducing flaring by lowering breakdown potential in said gap, said means for reducing flaring including:

spacing means for setting said gap distance to a magnitude great enough to cause said writing voltage to be out of said field emission region; said spacing means is adjustable with respect to said recording means, and said spacing means is retractable allowing cleaning of said recording means when said recording means is not recording; and gas supply means for supplying a gas to said gap, said gas having a Paschen curve voltage less than a Paschen curve voltage for air, whereby the introduction of said gas causes said image voltage to be sufficient for writing by increasing the difference between said writing voltage and said breakdown voltage threshold.

20. A device according to claim 19 wherein said gap is ½ to 2 mils inclusive.

21. A device according to claim 19 wherein said spacing means comprises at least one slab extending substantially parallel to said array and adjacent to said recording means.

22. A device according to claim 21 wherein said retractable slab is controlled by a piezo-electric actuator.

23. A device according to claim 21 wherein said retractable slab is controlled by a differential screw.

24. A device according to claim 19 wherein said gas is Nitrogen.

25. A device according to claim 19 wherein said gas is Argon.

26. A device according to claim 19 wherein said gas is Helium.

27. A device according to claim 19 wherein said spacing means has a wear-resistant material on a surface where said spacing means comes in contact with said medium.

28. A device according to claim 27 wherein said wear-resistant material is a metal.

29. A device according to claim 27 wherein said wear-resistant material is a ceramic.

* * * * *